United States Patent [19]
Dykstra et al.

[11] Patent Number: 5,727,812
[45] Date of Patent: Mar. 17, 1998

[54] AIRBAG CUSHION ASSEMBLY HAVING A HORN SWITCH SECURED WITH A CUSHION STRAP

[75] Inventors: John E. Dykstra, North Logan; David B. Johnson, Brigham City; Patricia A. Lund, Plain City; Don L. Parker, Layton, all of Utah

[73] Assignee: Morton International, Inc., Chicago, Ill.

[21] Appl. No.: 752,356

[22] Filed: Nov. 19, 1996

[51] Int. Cl.[6] ........................................ B60R 21/16
[52] U.S. Cl. ............... 280/731; 280/743.2; 200/61.54
[58] Field of Search ........................ 280/231, 743.2, 280/728.1, 743.1; 200/61.54

[56] References Cited

U.S. PATENT DOCUMENTS

| | | | |
|---|---|---|---|
| 5,004,266 | 4/1991 | Miller et al. | 280/743 |
| 5,498,023 | 3/1996 | Adams et al. | 280/728.2 |
| 5,499,841 | 3/1996 | Trojan et al. | 200/61.54 X |
| 5,577,767 | 11/1996 | Nemoto | 280/731 |
| 5,626,358 | 5/1997 | Ricks et al. | 280/731 |

*Primary Examiner*—Christopher P. Ellis
*Attorney, Agent, or Firm*—George W. Rauchfuss; Gerald K. White

[57] ABSTRACT

An airbag cushion assembly including a horn switch unit secured to an airbag cushion with a cushion strap, with the cushion strap and horn switch unit cooperating to retain the airbag cushion in a deflated, folded position prior to mounting the airbag cushion assembly within an airbag module and prior to inflation of the airbag cushion. The horn switch unit defines a first elongated slot, a second elongated slot and a weakened portion rupturable upon a force created by inflation of the airbag cushion to break the horn switch unit between a first and a second elongated slots defined by the horn switch unit. The horn switch unit is positioned on the folded airbag cushion opposite the collar, with a first elongated tether of the cushion strap extending through the first slot of the horn switch unit to a distal end secured to the collar of the airbag cushion, and a second elongated tether extending through the second slot of the horn switch unit to a distal end secured to the collar of the airbag cushion.

19 Claims, 6 Drawing Sheets

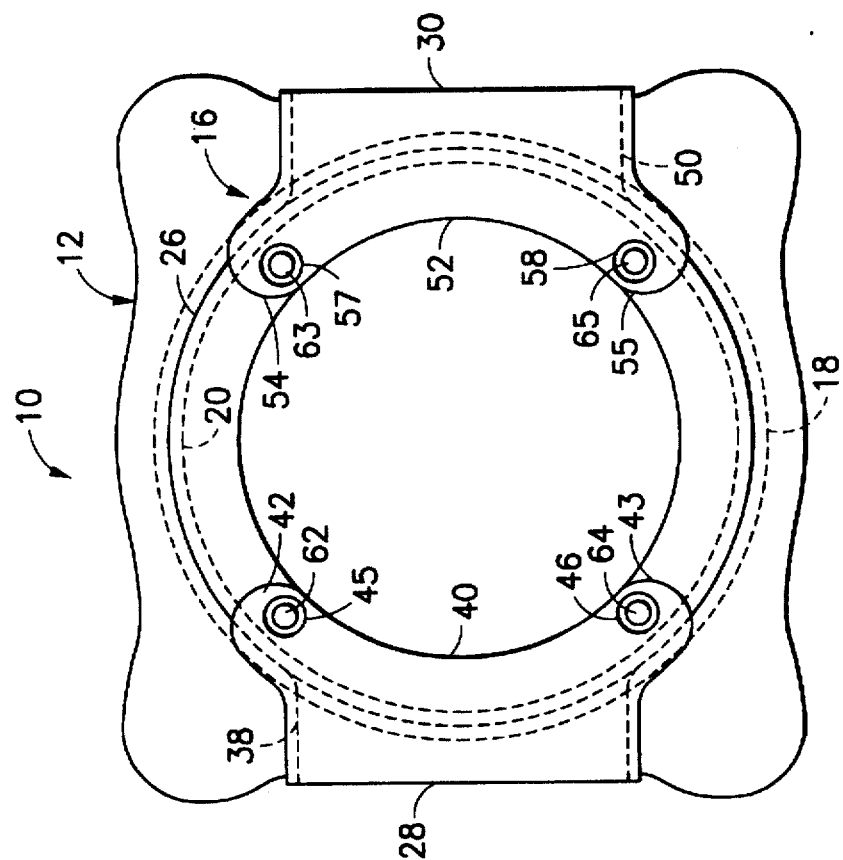
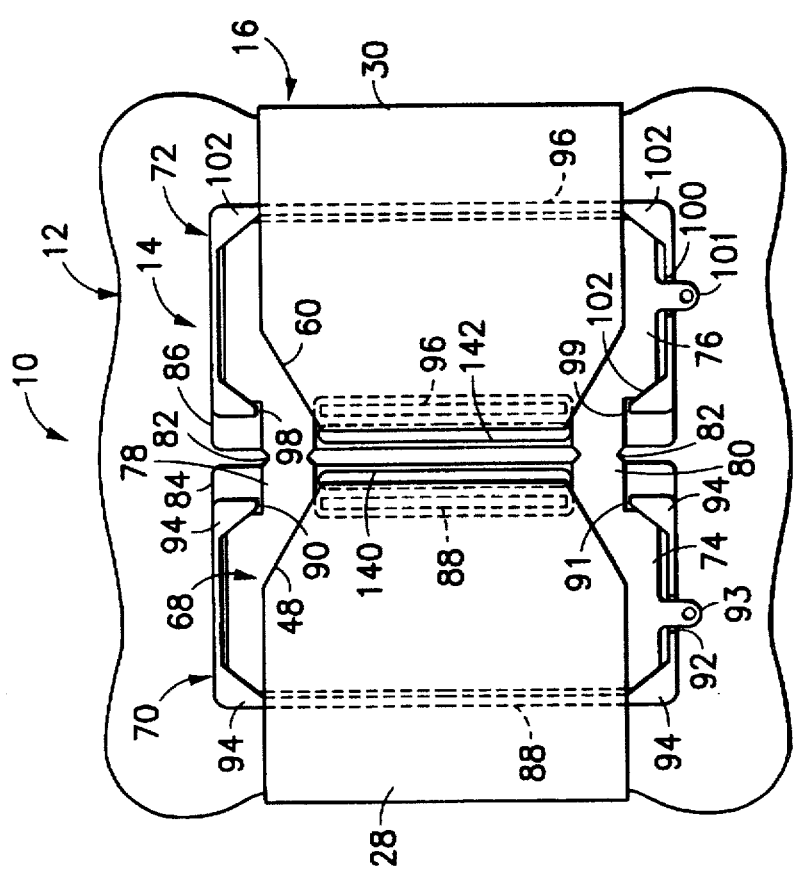
FIG. 6
FIG. 5

5,727,812

AIRBAG CUSHION ASSEMBLY HAVING A HORN SWITCH SECURED WITH A CUSHION STRAP

FIELD OF THE INVENTION

The present invention relates to an airbag module for protecting an occupant during a vehicle collision. More specifically, the present invention relates to an airbag module horn switch attachment and, even more specifically, to an airbag cushion assembly having a horn switch secured with a cushion strap.

BACKGROUND OF THE INVENTION

Driver side airbag modules, which include an airbag cushion, a module housing and an airbag module cover, are normally positioned within a hub of a steering wheel of a motor vehicle. An annular retainer ring secures the airbag cushion to the airbag module, and a cushion strap may hold the airbag cushion in a folded position prior to deployment. Both the airbag module cover and the cushion strap include a tear seam or weakened portion for allowing the airbag cushion to break through the airbag module cover and the cushion strap and fully deploy upon being inflated during a collision or rapid deceleration of the motor vehicle.

The hub of the steering wheel happens to be the same area which conventionally includes the horn switch. Accordingly, the airbag module cover additionally includes a horn actuation face that a vehicle driver can press for actuation of the horn switch. Some horn switch units include a membrane type horn switch and a backing plate, and the horn switch unit is usually attached to an inner surface of the horn actuation face of the airbag module cover by ultrasonic welding or heat staking.

Mounting the horn switch unit to the airbag module cover by ultrasonic welding or heat staking is a time consuming assembly process that increases the cost of manufacturing the airbag module. In addition, the horn switches are sometimes damaged by heat staking, requiring the replacement of both the horn switch unit and airbag module cover since the entire airbag module cover must be replaced when replacing a damaged or defective horn switch unit welded to the airbag module cover. Furthermore, heat staking puts constraints on the design, material and manufacture of the airbag module cover.

SUMMARY OF THE INVENTION

A general object of the present invention, therefore, is to provide an improved airbag module.

A more specific object of the present invention is to provide an airbag module having an improved horn switch attachment.

Another object of the present invention is to provide a horn switch unit that is mounted within an airbag module without welding or heat staking the horn switch unit to a module cover of the airbag module.

A further object of the present invention is to provide a horn switch unit that is secured to an airbag cushion assembly of an airbag module.

In meeting one or more of the above objects there is provided a cushion strap for securing a horn switch unit to a folded, inflatable airbag cushion to form an airbag cushion assembly according to the present invention. The inflatable airbag cushion has a collar defining an open mouth for receiving inflation fluid, and the cushion strap includes first and second elongated tethers extending from the collar of the airbag cushion. The horn switch unit is positioned on top of the folded airbag cushion, generally opposite the collar of the airbag cushion. The horn switch unit includes a horn switch for closing a horn switch circuit to activate a remote vehicle horn upon being compressed, and at least one rigid support plate secured to the horn switch. The horn switch unit also defines first and second elongated slots.

The first elongated tether of the cushion strap extends through the first slot of the horn switch unit with the distal end of the first elongated tether secured to the collar of the airbag cushion, and the second elongated tether extends through the second slot of the horn switch unit with the distal end of the second elongated tether secured to the collar of the airbag cushion. The first elongated tether, the second elongated tether and the horn switch unit, therefore, cooperate to retain the airbag cushion in a folded condition prior to inflation of the airbag cushion. The horn switch unit additionally defines a weakened portion rupturable upon a force created by inflation of the airbag cushion to break the horn switch unit between the first and the second elongated slots so that the folded airbag cushion can properly deploy upon being inflated.

The present invention also provides an airbag module including an airbag cushion assembly as described above. The airbag module further includes a module baseplate, with the airbag cushion assembly secured to the module baseplate, and a module cover positioned over the airbag cushion assembly and secured to the module baseplate. The module cover defines at least one tear seam positioned over the weakened portion of the horn switch unit. The airbag module also includes an airbag inflator secured to the module baseplate with a portion of the airbag inflator defining a plurality of inflation gas ports positioned within the mouth of the airbag cushion. The airbag cushion assembly according to the present invention allows the horn switch unit to be mounted within the airbag module without being welded or otherwise attached to the module cover.

The invention together with further objects, features, advantages and aspects thereof, will be more clearly understood from the following description taken in connection with the accompanying drawings.

BRIEF DESCRIPTION OF THE DRAWINGS

FIG. 5 is a top plan view of the airbag cushion assembly of FIG. 4;

FIG. 6 is a bottom plan view of the airbag cushion assembly of FIG. 4;

3

Figure 1:
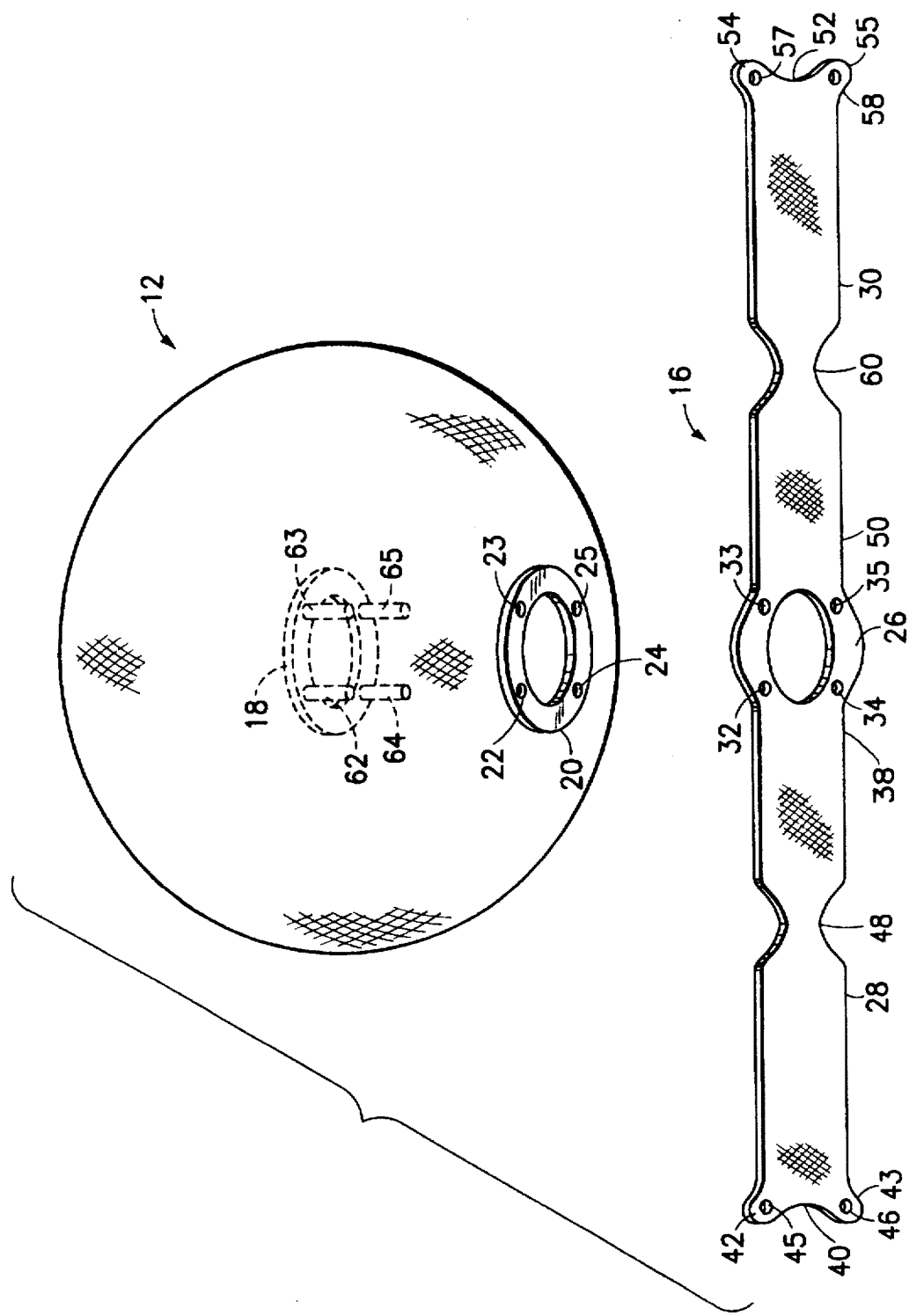
FIG. 1 is an exploded perspective view of an airbag cushion and a cushion strap according to the present invention.

The same reference numerals refer to the same elements throughout the various figures.

DETAILED DESCRIPTION OF THE INVENTION

Figure 7:
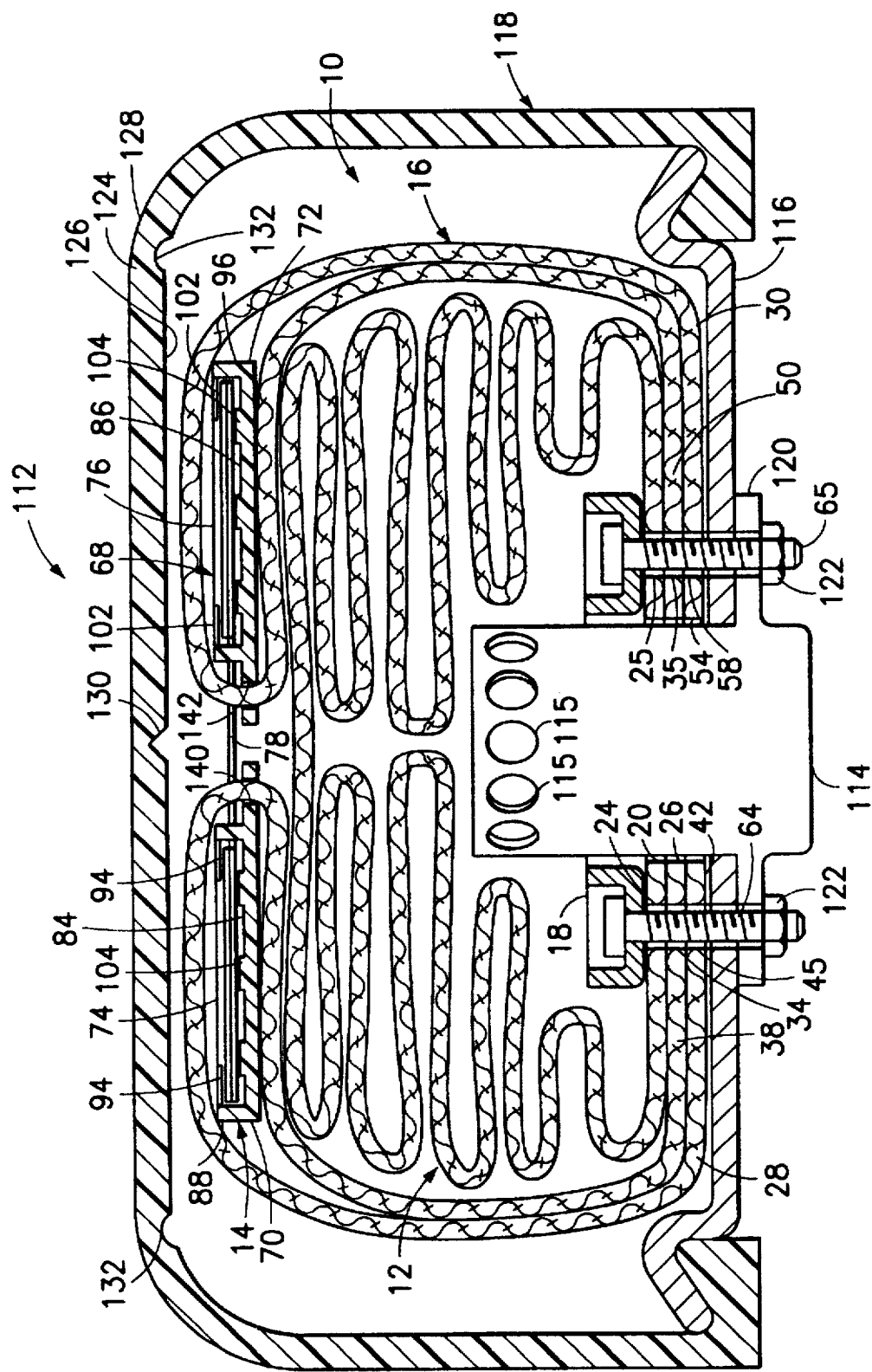
FIG. 7 is a partial sectional view of an airbag module according to the present invention including the airbag cushion assembly of FIGS. 4 through 6.

Referring to FIG. 7, the present invention provides an airbag cushion assembly 10 including an airbag cushion 12 and a horn switch unit 14 secured with a cushion strap 16. The airbag cushion assembly 10 having the horn switch unit 14 secured with a cushion strap 16 avoids the necessity of having to secure the horn switch unit within an airbag module 112 by welding the horn switch unit to an inner face 126 of a module cover 118.

Referring to FIG. 1, the airbag cushion assembly 10 includes the airbag cushion 12, the cushion strap 16 and a retainer ring 18. The airbag cushion 12 has a collar 20 forming an open mouth and defining four spaced-apart bolt holes 22,23,24,25. The cushion strap 16, which can be made from the same material as the airbag cushion 12, includes a collar 26, a first elongated strap or tether 28 and an opposed second elongated strap or tether 30 extending radially from the collar 26. The collar 26 is similar to the collar 20 of the airbag cushion 12, defines four spaced-apart bolt holes 33,33,34,35, and is positioned adjacent to the collar of the airbag cushion with the bolt holes of the collar of the cushion strap 16 aligned with the bolt holes 22,23,24,25 of the collar of the airbag cushion. The collar 26 of the cushion strap 16 could also be secured to the collar 20 of the airbag cushion 12 as an integral piece by stitching for example.

The first tether 28 of the cushion strap 16 extends from a first end 38 that is unitary with the collar 26 of the cushion strap, to a distal end 40. The distal end 40 includes two spaced-apart tabs 42,43, and each tab defines a bolt hole 45,46. The first tether 28 includes a narrowed portion 48 located generally midway between the first end 38 and the distal end 40. The second tether 30 extends from a first end 50 that is unitary with the collar 26 of the cushion strap 16, opposite the first end 38 of the first tether 28, to a distal end 52. The distal end 52 includes two spaced-apart tabs 54,55, and each tab defines a bolt hole 57,58. The second tether 30 also includes a narrowed portion 60 located generally midway between the first end 50 and the distal end 52. In the alternative, the cushion strap 16 could be provided without the collar 26 and the first ends 38,50 of the first and the second tethers 28,30 could extend as unitary pieces from, or otherwise be secured to the collar 20 of the airbag cushion 12.

The retainer ring 18 is positioned within the airbag cushion 12 over the collar 20 of the airbag cushion and includes four threaded bolts 62,63,64,65 extending downwardly from the retainer ring. The bolts 62,63,64,65, which can be formed integrally with the retainer ring 18, pass through the bolt holes 22,23,24,25 of the collar 20 of the airbag cushion 12 and the bolt holes 32,33,34,35 of the collar 26 of the cushion strap 16 to secure the collar of the cushion strap to the collar of the airbag cushion.

Figure 2:
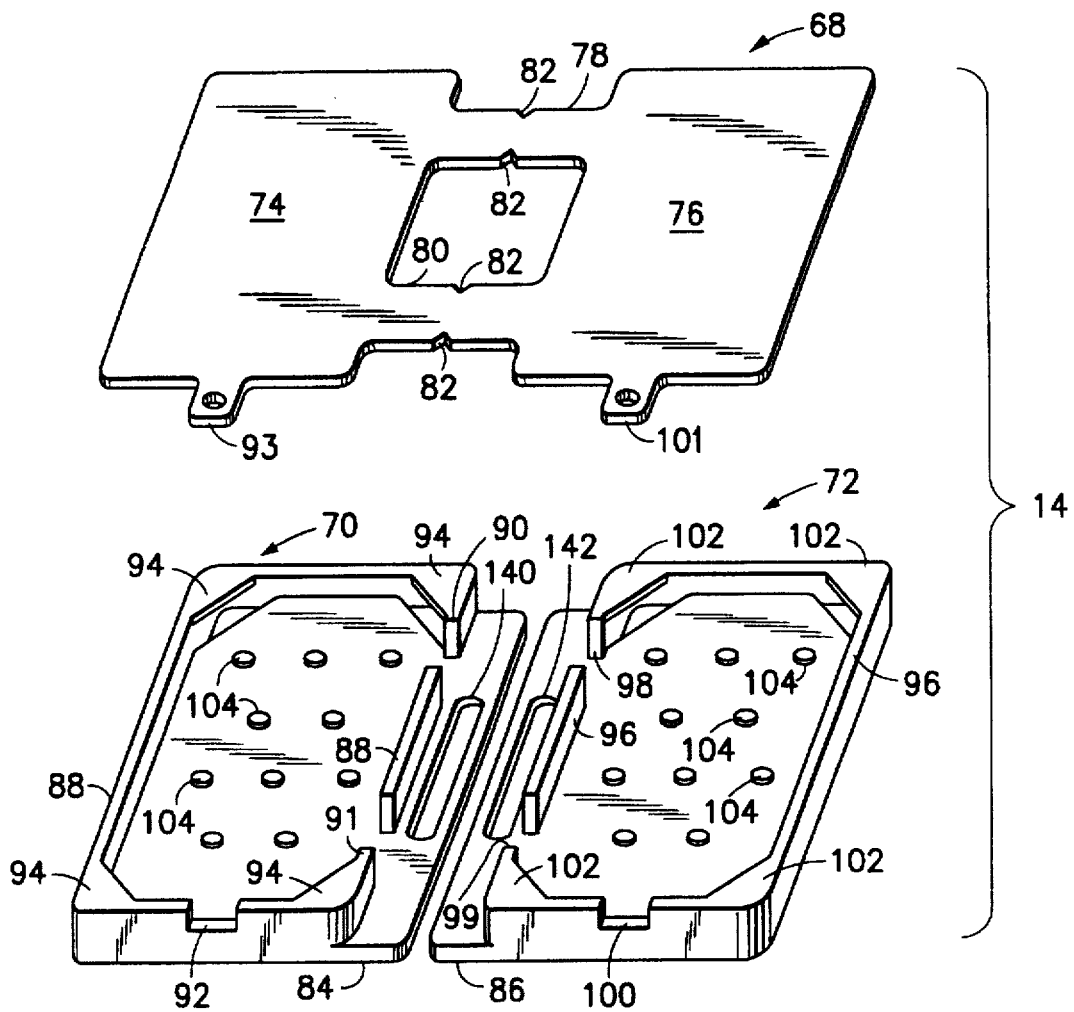
FIG. 2 is an exploded perspective view of a horn switch unit according to the present invention including a membrane horn switch and a first and a second support plates.

Referring to FIG. 2, the horn switch unit 14 includes a membrane horn switch 68, a first support plate 70, and a second support plate 72. Membrane horn switches are known to those skilled in the art and generally include two very thin sheets of flexible substrate having conductive coatings thereon which are separated by thin spacers. Pressure on the membrane horn switch 68 pushes the conductive coatings together to close a horn control circuit that the membrane horn switch is connectable to in order to actuate a remote horn.

4

The membrane horn switch 68 includes a first main switch section 74 and a second main switch section 76 connected by spaced-apart first and second narrowed bridge members 78,80. The bridge members 78,80 act as a weakened portion of the horn switch unit 14 rupturable upon a force created by an inflating airbag cushion in order to split the horn switch unit and permit deployment of the inflating airbag cushion therethrough. Each bridge member 78,80 can include notches 82 at about midway between the first and the second main switch sections 74,76 in order to help the bridge members rupture more readily.

The first support plate 70 includes a generally flat, rigid base 84 supporting the first main switch section 74, and the second support plate 72 also includes a generally flat, rigid base 86 supporting the second main switch section 76. As shown, the bases 84,86 and the first and the second main switch sections 74,76 are all generally rectangular, however, the bases and the first and the second main switch sections can be any suitable complimentary shape, such as square, round or oval for example and can also curve somewhat to match the curvature of an airbag module cover. The first and the second support plates 70,72 provide the rigid bases 84,86 against which the membrane horn switch 68 can be compressed for actuation.

The first support plate 70 also includes a substantially continuous peripheral wall 88 unitary with and extending upwardly from and generally perpendicular to the base 84. The peripheral wall 88 peripherally retains the first large switch section 74 above the base 84. The peripheral wall 88 is peripherally larger than the first main switch section 74 so that the first main switch section is loosely retained by the peripheral wall. The peripheral wall 88 defines two spaced-apart gaps 90,91 facing the second main switch section 76 and allowing the first and the second bridge members 78,80 of the horn switch 68 to extend therethrough. The peripheral wall 88 also defines a third gap 92 for allowing a first electrical lead 93 of the horn switch 68 to pass therethrough for connection to a horn control circuit (not shown). The first support plate 70 also includes means for retaining the first main switch section 74 within the peripheral wall 88 in the form of four tabs 94 unitary with, and extending inwardly from and generally perpendicular to the peripheral wall at four corners of the peripheral wall. Each tab 94 extends over, respectively, a corner of the first main switch section 74, so that the first main switch section is held between the tabs, the peripheral wall 88 and the base 84. The base 84 of the first support plate 70 defines an elongated slot 140 outside of the peripheral wall 88, positioned below and between the first and the second bridge members 78,80 of the horn switch 68.

The second support plate 72 also includes a substantially continuous peripheral wall 96 unitary with and extending upwardly from and generally perpendicular to the base 86. The peripheral wall 96 peripherally retains the second main switch section 76 above the base 86. The peripheral wall 96 is peripherally larger than the second main switch section 76 so that the second main switch section is loosely retained by the peripheral wall. The peripheral wall 96 defines two spaced-apart gaps 98,99 facing the first main switch section 74 and allowing the first and the second bridge members 78,88 of the horn switch 68 to extend therethrough. The peripheral wall 96 defines a third gap 100 for allowing a second electrical lead 101 of the horn switch 68 to pass therethrough for connection to a horn control circuit. The second support plate 72 also includes means for retaining the second main switch section 76 within the peripheral wall 96 in the form of four tabs 102 unitary with, and extending inwardly from and generally perpendicular to the peripheral wall, at four corners of the peripheral wall. Each tab 102 extends over, respectively, a corner of the second main switch section 76, so that the second main switch section is held between the tabs, the peripheral wall 96 and the base 86. The base 86 of the second support plate 72 defines an elongated slot 142 outside of the peripheral wall 96, positioned below and between the first and the second bridge members 78,80 of the horn switch 68. As shown, the first and the second support plates 70,72 further include a plurality of spaced-apart force concentrators 104 within the peripheral walls 88,96 in the form of cylindrical studs unitary with and extending upwardly from the bases 84,86 towards the horn switch 68.

Figure 3:
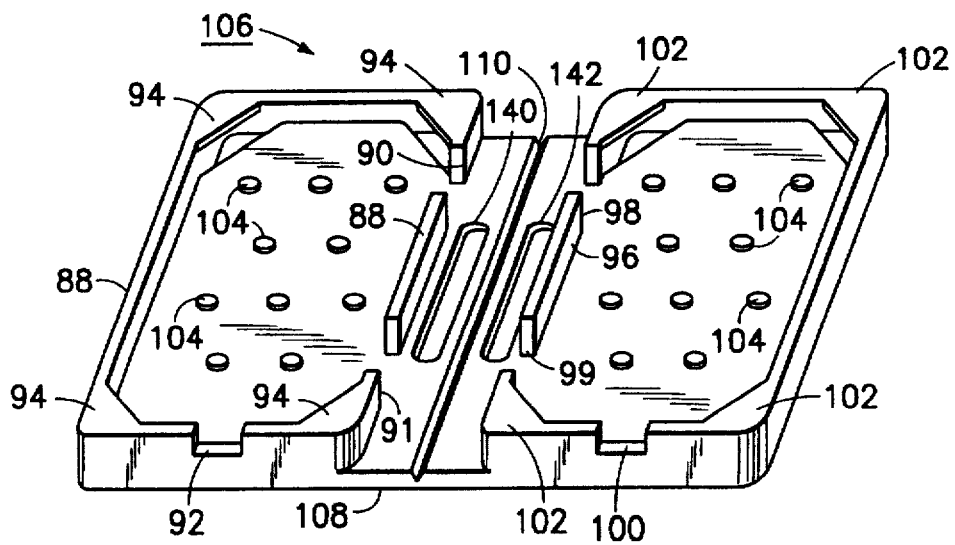
FIG. 3 is a perspective view of another support plate according to the present invention for use with the membrane horn switch of FIG. 2.
Figure 4:
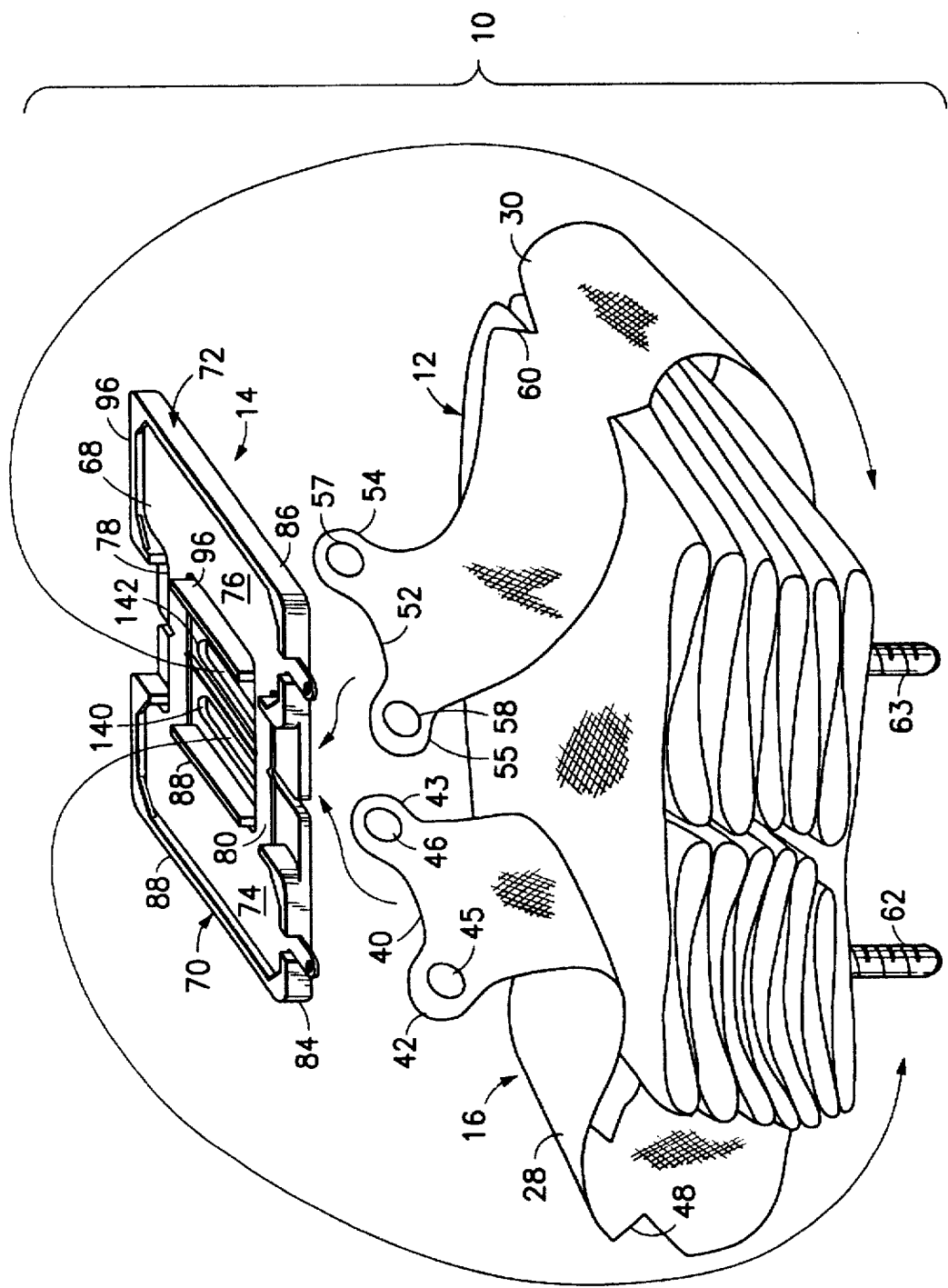
FIG. 4 is a perspective view of the horn switch unit of FIG. 2 being assembled to the airbag cushion and cushion strap of FIG. 1 to form an airbag cushion assembly according to the present invention.

Referring to FIG. 3, a single support 106 plate for use with the horn switch 68 of FIG. 2 in place of the first and the second support plates 70,72 is shown. The support plate 106 basically combines the first and the second support plates 70,72 of FIG. 2 into a single piece, and elements which are the same have the same reference numerals. The support plate 106 includes a single base 108 sized to support the entire membrane horn switch 68 and the base defines a centrally located rupturable tear seam 110 between the first and the second elongated slots 140,142. The tear seam 110 acts as a weakened portion rupturable upon a force created by an inflating airbag cushion in order to split the support plate 106 between the first and the second elongated slots 140,142.

Figure 8:
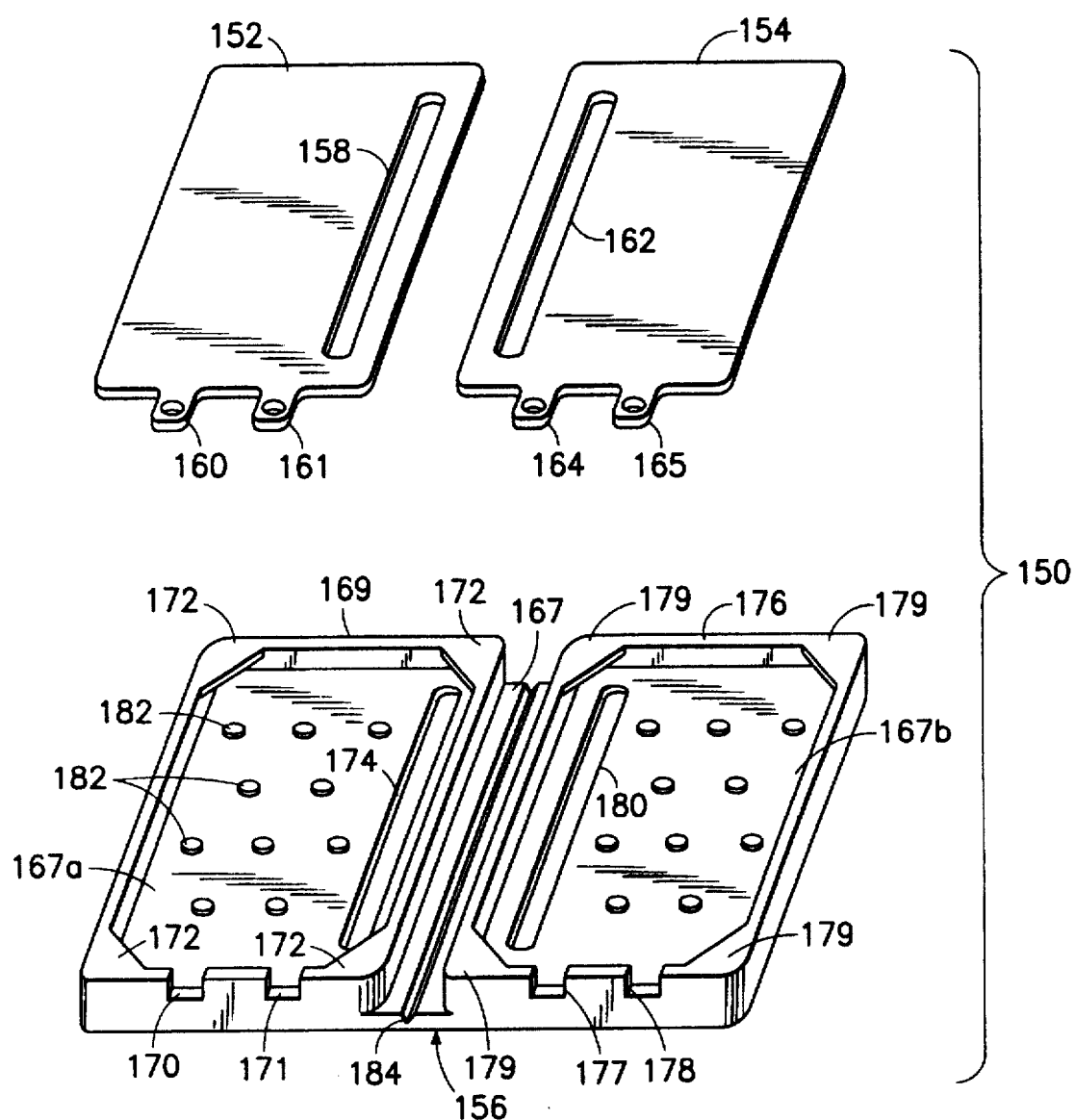
FIG. 8 is an exploded perspective view of another horn switch unit according to the present invention including a first and a second support plate.

Referring to FIG. 8, an alternative horn switch unit 150 according to the present invention includes a first membrane horn switch 152, a second membrane horn switch 154 and a single support plate 156. The first horn switch 152 defines an elongated aperture 158 and has two leads 160,161, while the second horn switch 154 defines an elongated aperture 162 and has two leads 164,165.

The support plate 156 includes a base 167 supporting both membrane horn switches 152,154. The support plate 156 also includes a substantially continuous first peripheral wall 169 unitary with and extending upwardly from and generally perpendicular to a first portion 167a of the base 167. The first peripheral wall 169 peripherally retains the first horn switch 152 above the first portion 167a of the base 167. The first peripheral wall 169 defines two spaced-apart gaps 170,171 allowing the two leads 160,161 of the first horn switch 152 to extend therethrough. The first peripheral wall 169 also includes four tabs 172 retaining the first horn switch 152 within the first peripheral wall. The first portion 167a of the base 167 of the support plate 156 defines an elongated slot 174 within the first peripheral wall 169, positioned below the elongated aperture 158 defined by the first horn switch 152.

The support plate 156 also includes a substantially continuous second peripheral wall 176 unitary with and extending upwardly from and generally perpendicular to a second portion 167b of the base 167. The second peripheral wall 176 peripherally retains the second horn switch 154 above the second portion 167b of the base 167. The second peripheral wall 176 defines two spaced-apart gaps 177,178 allowing the two leads 164,165 of the second horn switch 154 to extend therethrough. The second peripheral wall 176 also includes four tabs 179 retaining the second horn switch 154 within the second peripheral wall. The second portion 167b of the base 167 of the support plate 156 defines an elongated slot 180 within the second peripheral wall 176, positioned below the elongated aperture 162 defined by the second horn switch 154.

As shown, the support plate 156 further includes a plurality of spaced-apart force concentrators 182 within the first and the second peripheral walls 169,176 in the form of cylindrical studs unitary with and extending upwardly from the base 167 towards the first and the second horn switches 152,154. In addition, the base 167 defines a centrally located rupturable tear seam 184 between the first and the second peripheral walls 169,176.

As shown in FIGS. 4 through 7, the horn switch unit 14 of FIG. 2 is assembly to the airbag cushion 12, the cushion strap 16 and the retainer ring 18 to form the airbag cushion assembly 10 by first folding the airbag cushion and positioning the horn switch unit on top of the folded airbag cushion opposite the collar 20 of the airbag cushion. The first elongated tether 28 of the cushion strap 16 extends under the first support plate 70, up through the first elongated slot 140, with the narrowed portion 48 engaging the first elongated slot, over the first main switch section 74 and extends over itself back to the collar 26 of the cushion strap. The distal end 40 of the first elongated tether 28 is secured to the collar 26 with the bolt holes 45,46 of the two tabs 42,43 of the distal end receiving two bolts 62,64 of the retainer ring 18. The second elongated tether 30 of the cushion strap 16 extends under the second support plate 72, up through the second elongated slot 142, with the narrowed portion 60 engaging the second elongated slot, over the second main switch section 76 and extends over itself back to the collar 26 of the cushion strap. The distal end 52 of the second elongated tether 30 is secured to the collar 26 with the bolt holes 57,58 of the two tabs 54,55 of the distal end receiving two bolts 63,65 Of the retainer ring 18. The first and the second elongated tethers 28,30 of the cushion strap 16, therefore, cooperate with the horn switch unit 14 to retain the airbag cushion 12 in a folded condition. The airbag cushion assembly 10 including the horn switch unit 14, the retainer ring 18, the folded airbag cushion 12 and the cushion strap 16 can be treated as a single unit for shipping and handling prior to being mounted in an airbag module.

Referring to FIG. 7, the airbag cushion assembly 10 with the secured horn switch unit 14 is mounted in an airbag module 112 also including an airbag inflator 114, a module housing 116 and a module cover 118. The airbag module 112 is a driver side airbag module for mounting in a hub of a steering wheel, and is known to those skilled in the art and, therefore, only described in detail as is relevant to the present invention. The airbag cushion assembly 10 is positioned within the module housing 116 and covered with the module cover 118, and a portion of the airbag inflator 114 defining inflation gas ports 115 extends through the module housing and through the collar 20 of the airbag cushion 12. The collar 20 of the airbag cushion, the collar 26 of the cushion strap 16 and the tabs 42,43,54,55 of the first and the second tethers 28,30 are sandwiched between the annular retainer ring 18 and the module housing 116. The four bolts 62,63,64,65 Of the retainer ring 18 extending through the module housing 116 and a flange 120 of the airbag inflator 114, and are secured with four nuts 122 (only two are shown).

The module cover 118 includes a horn activation face 124 and the horn switch unit 14 is located directly below an inner surface 126 of the horn activation face, so that a vehicle driver can apply pressure to an outer surface 128 of the horn activation face to activate the membrane horn switch 68. For purposes of illustration, the airbag cushion 12 is shown loosely folded and packed within the module cover 118. Actually, the airbag cushion 12 and the horn switch unit 14 are packed tightly against the inner surface 126 of the horn activation face 124 so that the horn activation face does not have to be depressed very much to actuate the horn switch 68. Also for purposes of illustration, the airbag cushion 12 is shown thicker than actual.

Each peripheral wall 88,96 of the first and the second support plates 70,72 have a height above the bases 84,86 that is greater than a thickness of the membrane horn switch 68. The difference between the height of the peripheral walls 88,96 and the thickness of the horn switch 68 provides an expansion space above the horn switch and ensures that the horn switch will not be compressed, by thermal expansion or contraction of the module cover 118 for example, prior to the module cover being depressed by a vehicle driver. The tabs 94,102 of the first and the second support plates 70,72 are equal with top edges of the peripheral walls 88,96, and each tab has a thickness that is less than the difference between the height of the peripheral walls and the thickness of the horn switch 68. The tabs 94,102, therefore, do not tightly clamp the horn switch 68, but prevent the horn switch from escaping from within the peripheral walls 88,96. In addition, each of the force concentrators 104 of the first and the second support plates 70,72 has a height that is less than the difference between the height of the peripheral walls 88,96 and both the thickness of the horn switch 68 and the thickness of one of the tabs 94,102, again, to ensure that the horn switch will not be compressed prior to the module cover 118 being depressed by a vehicle driver.

The horn activation face 124 of the airbag module cover 118 defines a centrally located tear seam 130, and the airbag cushion assembly 10 is positioned so that the first and the second bridge members 78,80 of the membrane horn switch 68 traverse the tear seam. Upon inflation of the airbag cushion 12, the first and the second bridge members 78,80 rupture so that the first main switch section 74, the first support plate 70 and the first elongated tether 28 swing in one direction, while the second main switch section 76, the second support plate 72 and the second elongated tether 30 swing in an opposite direction out of the way of the inflating airbag cushion. The horn activation face 124 of the module cover 118 also ruptures at the tear seam 130 and opens about hinges 132, out of the path of the inflating airbag cushion 12 so that the airbag cushion can be correctly deployed to cushion a vehicle driver. The first and the second elongated tethers 28,30 of the cushion strap 16 are designed so that no part of the first and the second elongated tethers is weaker than the first and the second bridge members 78,80 of the horn switch 68 so that only the bridge members will rupture upon inflation of the airbag cushion 12. The first and the second elongated tethers 28,30 of the cushion strap 16, therefore, ensure that the two separated halves of the horn switch unit 14 stay secured to the airbag module 112 and do not become projectiles upon the rapid inflation of the airbag cushion 12.

The airbag cushion assembly 10 according to the present invention, including the cushion strap 16 securing the horn switch unit 14, allows the horn switch unit to be mounted within the airbag module 112 without being heat staked or welded to the module cover 118. The airbag cushion assembly 10 also simplifies assembly of the airbag module 112 since the horn switch unit 14 does not have to be attached to the module cover 118 and tools are not required to secure the horn switch unit with the cushion strap 16.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A horn switch unit for use as part of an airbag cushion assembly having an inflatable folded airbag cushion and a first elongated tether and a second elongated tether extending from the airbag cushion, the horn switch unit comprising:

at least one horn switch for closing a horn switch circuit to activate a remote vehicle horn upon being compressed;

at least one rigid support plate secured to the at least one horn switch;

the horn switch unit defining a first elongated slot for receiving the first elongated tether of the airbag cushion assembly, a second elongated slot for receiving the second elongated tether of the airbag cushion assembly, and a weakened portion of the horn switch unit rupturable by a force produced by an inflating airbag cushion to break the horn switch unit between the first elongated slot and the second elongated slot;

whereby the horn switch unit can cooperate with the first elongated tether and the second elongated tether to retain the airbag cushion in a folded condition prior to inflation of the airbag cushion.

2. A horn switch unit according to claim 1 wherein the at least one horn switch comprises a membrane horn switch.

3. A horn switch unit according to claim 1 wherein:

the at least one horn switch comprises a single horn switch including a first main switch section and a second main switch section connected by spaced-apart narrowed first and second bridge members forming the weakened portion of the horn switch unit; and the at least one rigid support plate comprises a single rigid support plate secured to the horn switch and defining the first elongated slot between the first and the second bridge members and defining the second elongated slot between the first and the second bridge members, the support plate also defining a tear seam between the first and the second elongated slots, the tear seam also acting as the weakened portion of the horn switch.

4. A horn switch unit according to claim 1 wherein:

the at least one horn switch comprises a first horn switch defining an elongated aperture, and a second horn switch defining an elongated aperture; and the at least one rigid support plate comprises a single rigid support plate secured to both the first horn switch and the second horn switch, and defining the first elongated slot below the elongated aperture of the first horn switch and defining the second elongated slot below the elongated aperture of the second horn switch, the support plate also defines a tear seam between the first and the second elongated slots, the tear seam being the weakened portion of the horn switch.

5. A horn switch unit according to claim 1 wherein:

the at least one horn switch comprises a single horn switch including a first main switch section and a second main switch section connected by spaced-apart narrowed first and second bridge members forming the weakened portion of the horn switch; and the at least one rigid support plate includes a first rigid support plate secured to the first main switch section of the horn switch and defining the first elongated slot between the first and the second bridge members and a second rigid support plate secured to the second main switch section of the horn switch and defining the second elongated slot between the first and the second bridge members.

6. A horn switch unit according to claim 5 wherein:

A) the first support plate includes,
   a base supporting the first main switch section of the horn switch and defining the first elongated slot,
   a peripheral wall extending upwardly from and generally perpendicular to the base, and peripherally retaining the first main switch section of the horn switch, the peripheral wall defining two spaced-apart gaps allowing the first and the second bridge members to extend through the peripheral wall, and
   means retaining the first main switch section of the horn switch within the peripheral wall, securing the first main switch section to the first support plate; and B) the second support plate includes,
   a base supporting the second main switch section of the horn switch and defining the second elongated slot,
   a peripheral wall extending upwardly from and generally perpendicular to said base, and peripherally retaining the second main switch section of the horn switch, said peripheral wall defining two spaced-apart gaps allowing the first and the second bridge members to extend through said peripheral wall, and
   means retaining the second main switch section of the horn switch within said peripheral wall, securing the second main switch section to the second support plate.

7. A cushion strap for use as part of an airbag cushion assembly also including a folded inflatable airbag cushion having a collar defining an open mouth for receiving inflation fluid, a retainer ring positioned within the airbag cushion over the collar and having a plurality of spaced-apart studs extending through a plurality of stud holes in the collar, and a horn switch unit positioned on the folded airbag cushion generally opposite the collar, the horn switch unit defining a first elongated slot, a second elongated slot and a weakened portion rupturable upon inflation of the airbag cushion for breaking the horn switch unit between the first and the second elongated slots, the cushion strap comprising:

a collar defining a plurality of stud holes for receiving the plurality of spaced-apart studs extending from the retainer ring to secure the collar of the cushion strap to the collar of the airbag cushion;
   a first elongated tether sized to extend from a first end secured to the collar of the cushion strap, and through the first slot of the horn switch unit to a distal end defining at least two stud holes for receiving at least two of the plurality of spaced-apart studs extending from the retainer ring to secure the distal end to the collar of the cushion strap; and
   a second elongated tether sized to extend from a first end secured to the collar of the cushion strap generally opposite the first end of the first elongated tether, and through the second slot of the horn switch unit to a distal end defining at least two stud holes for receiving at least two of the plurality of spaced-apart studs extending from the retainer ring to secure said distal end to the collar of the cushion strap;
   whereby the first elongated tether, the second elongated tether and the horn switch unit will cooperate to retain the airbag cushion in a folded condition prior to inflation of the airbag cushion.

8. A cushion strap according to claim 7 wherein the first elongated tether includes a narrowed portion for engaging the first slot of the horn switch unit, the narrowed portion located generally midway between the first end and the distal end of the first elongated tether, and the second elongated tether also includes a narrowed portion for engaging the second slot of the horn switch unit, said narrowed portion located generally midway between the first end and the distal end of the second elongated tether.

9. A airbag cushion assembly for use with a horn switch unit defining a first elongated slot, a second elongated slot and a weakened portion rupturable upon inflation of an airbag cushion for breaking the horn switch unit between the first and the second elongated slots, the airbag cushion assembly including:

a folded, inflatable airbag cushion having a collar defining an open mouth of the airbag cushion for receiving inflation fluid;
   a retainer ring positioned within the airbag cushion over the collar and having a plurality of spaced-apart studs extending through a plurality of stud holes in the collar;
   a first elongated tether sized to extend from a first end secured to the collar of the airbag cushion, and through the first slot of the horn switch unit when the horn switch unit is positioned on the folded airbag cushion generally opposite the collar, to a distal end defining at least two stud holes for receiving at least two of the plurality of spaced-apart studs extending from the retainer ring to secure the distal end to the collar; and
   a second elongated tether sized to extend from a first end secured to the collar of the airbag cushion generally opposite the first end of the first elongated tether, and through the second slot of the horn switch unit to a distal end defining at least two stud holes for receiving at least two of the plurality of spaced-apart studs extending from the retainer ring to secure said distal end to the collar;
   whereby the first elongated tether, the second elongated tether and the horn switch unit will cooperate to retain the airbag cushion in a folded condition prior to inflation of the airbag cushion.

10. An airbag cushion assembly according to claim 9 wherein the first elongated tether of the cushion strap includes a narrowed portion for engaging the first slot of the horn switch unit, the narrowed portion located generally midway between the first end and the distal end of the first elongated tether, and the second elongated tether of the cushion strap also includes a narrowed portion for engaging the second slot of the horn switch unit, said narrowed portion located generally midway between the first end and the distal end of the second elongated tether.

11. An airbag cushion assembly according to claim 9 wherein the cushion strap further includes a collar defining a plurality of stud holes receiving the plurality of spaced-apart studs extending from the retainer ring and securing the collar of the cushion strap to the collar of the airbag cushion, with the first end of the first elongated tether secured to the collar of the cushion strap, and the first end of the second elongated tether secured to the collar of the cushion strap.

12. An airbag cushion assembly comprising:

A) a folded, inflatable airbag cushion having a collar defining an open mouth of the airbag cushion for receiving inflation fluid;

B) a cushion strap including a first elongated tether extending from a first end secured to the collar of the airbag cushion to a distal end, and a second elongated tether extending from a first end secured to the collar of the airbag cushion to a distal end; and C) a horn switch unit positioned on top of the folded airbag cushion generally opposite the collar and including, 1) at least one horn switch for closing a horn switch circuit to activate a remote vehicle horn upon being compressed, and
2) at least one rigid support plate secured to the at least one horn switch, with
 the horn switch unit defining a first elongated slot with the first elongated tether of the cushion strap extending through the first elongated slot of the horn switch unit and the distal end of the first elongated tether secured to the collar of the airbag cushion, the horn switch unit defining a second elongated slot with the second elongated tether of the cushion strap extending through the second elongated slot of the horn switch unit and the distal end of the second elongated tether secured to the collar of the airbag cushion, the horn switch unit also defining a weakened portion rupturable upon a force created by inflation of the airbag cushion to break the horn switch unit between the first and the second elongated slots;
 whereby the first elongated tether, the second elongated tether and the horn switch unit cooperate to retain the airbag cushion in a folded condition prior to inflation of the airbag cushion.

13. An airbag cushion assembly according to claim 12 wherein:
 the at least one horn switch of the horn switch unit comprises a single horn switch including a first main switch section and a second main switch section connected by spaced-apart first and second narrowed bridge members forming the weakened portion of the horn switch unit; and
 the at least one rigid support plate comprises a single rigid support plate secured to the horn switch and defining the first and the second elongated slots between the first and the second bridge members, with the first and the second tethers of the airbag cushion assembly extending between the first and the second bridge members, the support plate also defining a tear seam between the first and the second elongated slots, the tear seam also forming the weakened portion of the horn switch.

14. An airbag cushion assembly according to claim 12 wherein:
 the at least one horn switch of the horn switch unit comprises a first horn switch defining an elongated aperture and a second horn switch defining an elongated aperture; and
 the at least one rigid support plate comprises a single rigid support plate secured to both the first and the second horn switches and defining the first elongated slot below the elongated aperture of the first horn switch and defining the second elongated slot below the elongated aperture of the second horn switch, with the first tether of the airbag cushion assembly extending through the elongated aperture of the first horn switch and the first elongated slot of the support plate and the second tether extending through the elongated aperture of the second horn switch and the second elongated slot of the support plate, the support plate also defining the weakened portion of the horn switch in the form of a tear seam between the first and the second elongated slots.

15. An airbag cushion assembly according to claim 12 wherein:
 the at least one horn switch of the horn switch unit comprises a single horn switch including a first main switch section and a second main switch section connected by spaced-apart first and second narrowed bridge members forming the weakened portion of the horn switch; and
 the at least one rigid support plate includes a first rigid support plate secured to the first main switch section of the horn switch and defining the first elongated slot between the first and the second bridge members and a second rigid support plate secured to the second main switch section of the horn switch and defining the second elongated slot between the first and the second bridge members, with the first and the second tether of the cushion assembly extending between the first and the second bridge members.

16. An airbag cushion assembly according to claim 15 wherein the cushion strap further includes a collar secured to the collar of the airbag cushion, with the first end of the first elongated tether secured to the collar of the cushion strap and the distal end of the first elongated tether secured to the collar of the cushion strap, and the first end of the second elongated tether secured to the collar of the cushion strap and the distal end of the second elongated tether secured to the collar of the cushion strap.

17. An airbag cushion assembly according to claim 16 further including:
 a retainer ring having a plurality of spaced-apart studs extending from the retainer ring through a plurality of stud holes in the collar of the airbag cushion, and through a plurality of stud holes defined by the collar of the cushion strap, securing the collar of the cushion strap to the collar of the airbag cushion;
 the distal end of the first elongated tether defining at least two stud holes receiving at least two of the plurality of spaced-apart studs extending from the retainer ring securing the distal end of the first elongated tether to the collar of the cushion strap; and
 the distal end of the second elongated tether defining at least two stud holes receiving at least two of the plurality of spaced-apart studs extending from the retainer ring, securing the distal end of the second elongated tether to the collar of the cushion strap.

18. An airbag cushion assembly according to claim 15 further including:
 a retainer ring having a plurality of spaced-apart studs extending from the retainer ring through a plurality of stud holes in the collar of the airbag cushion;
 the distal end of the first elongated tether defining at least two stud holes receiving at least two of the plurality of spaced-apart studs extending from the retainer ring securing the distal end of the first elongated tether to the collar of the airbag cushion; and
 the distal end of the second elongated tether defining at least two stud holes receiving at least two of the plurality of spaced-apart studs extending from the retainer ring, securing the distal end of the second elongated tether to the collar of the airbag cushion.

19. An airbag module comprising:
A) a module baseplate;
B) an airbag cushion assembly secured to the module baseplate, the airbag module assembly including,
 1) a folded, inflatable airbag cushion having a collar defining an open mouth of the airbag cushion for receiving inflation fluid,
 2) a cushion strap including a first elongated tether extending from a first end secured to the collar of the airbag cushion to a distal end, and a second elongated tether extending from a first end secured to the collar of the airbag cushion to a distal end, and 3) a horn switch unit positioned on top of the folded airbag cushion generally opposite the collar and including, a) at least one horn switch for closing a horn switch circuit to activate a remote vehicle horn upon being compressed, and b) at least one rigid support plate secured to the at least one horn switch, with the horn switch unit defining a first elongated slot with the first elongated tether of the cushion strap extending through the first elongated slot of the horn switch unit and the distal end of the first elongated tether secured to the collar of the airbag cushion, the horn switch unit also defining a second elongated slot with the second elongated tether of the cushion strap extending through the second elongated slot of the horn switch unit and the distal end of the second elongated tether secured to the collar of the airbag cushion, the horn switch unit additionally defining a weakened portion rupturable upon a force created by inflation of the airbag cushion to break the horn switch unit between the first and the second elongated slots, whereby the first elongated tether, the second elongated tether and the horn switch unit cooperate to retain the airbag cushion in a folded condition prior to inflation of the airbag cushion;

C) a module cover positioned over the airbag cushion assembly and secured to the module baseplate, the module cover defining at least one tear seam positioned over the weakened portion of the horn switch unit; and D) an airbag inflator secured to the module baseplate with a portion of the airbag inflator defining a plurality of gas exhaust ports positioned within the mouth of the airbag cushion.

* * * * *